United States Patent [19]

Andreasen et al.

[11] Patent Number: 4,920,682

[45] Date of Patent: May 1, 1990

[54] ONE-PIECE INTEGRAL FISHING ROD HANDLE

[75] Inventors: James E. Andreasen, Magnolia Springs; Casey J. Childre; David B. Peed, both of Foley, all of Ala.

[73] Assignee: Lew Childre & Sons, Inc., Foley, Ala.

[21] Appl. No.: 182,468

[22] Filed: Apr. 18, 1988

Related U.S. Application Data

[62] Division of Ser. No. 822,752, Jan. 27, 1986, Pat. No. 4,762,584.

[51] Int. Cl.$^5$ ............................................. A01K 87/00
[52] U.S. Cl. ............................................ 43/22; 43/23
[58] Field of Search ....................................... 43/22, 23

[56] References Cited

U.S. PATENT DOCUMENTS

| 2,100,864 | 11/1937 | Mansur . | |
|---|---|---|---|
| 2,252,054 | 8/1941 | Welch | 43/23 |
| 2,458,920 | 1/1949 | Wheeler et al. . | |
| 2,604,661 | 7/1952 | Karns . | |
| 2,756,531 | 7/1956 | Hollenshead . | |
| 2,965,995 | 12/1960 | Lasky | 43/23 |
| 3,090,999 | 5/1963 | Karns . | |
| 3,374,503 | 3/1968 | Boniger . | |
| 3,418,742 | 12/1968 | Yaklyvich | 43/23 |
| 3,466,783 | 9/1969 | Priebe | 43/23 |
| 3,950,883 | 4/1976 | Shepherd . | |
| 4,077,150 | 3/1978 | Barnes | 43/23 |
| 4,334,378 | 6/1982 | Worth | 43/22 |
| 4,355,480 | 10/1982 | Morishita | 43/22 |
| 4,403,439 | 9/1983 | Wallace . | |
| 4,516,351 | 5/1985 | Highby | 43/22 |
| 4,577,432 | 3/1986 | Brackett et al. . | |
| 4,631,853 | 12/1986 | Brackett et al. . | |
| 4,646,462 | 3/1987 | Ohmura | 43/23 |
| 4,654,996 | 4/1987 | Gieselman | 43/23 |
| 4,738,046 | 2/1988 | Fraylick et al. | 43/23 |

FOREIGN PATENT DOCUMENTS 2131261  6/1984  United Kingdom .................... 43/23

Primary Examiner—Kurt Rowan
Attorney, Agent, or Firm—Lockwood, Alex, FitzGibbon & Cummings

[57] ABSTRACT

A one-piece fishing rod handle is provided in which an integral handle portion is molded together with preformed rod handle components such as a reel seat is disclosed for use in through-rod-type construction wherein the rod blank extends axially through the entire length of the handle and foregrip. The individual preformed rod handle components are assembled onto either a mold core pin or fishing rod blank and properly registered in a mold cavity having the configuration of the finished rod handle. Molding resins such as polyurethane are then injected into the mold cavity and provide a handle portion which is bonded to the preformed reel seat. By the use of two differently dimensioned molds in conjunction with different density molding resins, dual composition one-piece fishing rod handles can also be molded.

14 Claims, 8 Drawing Sheets

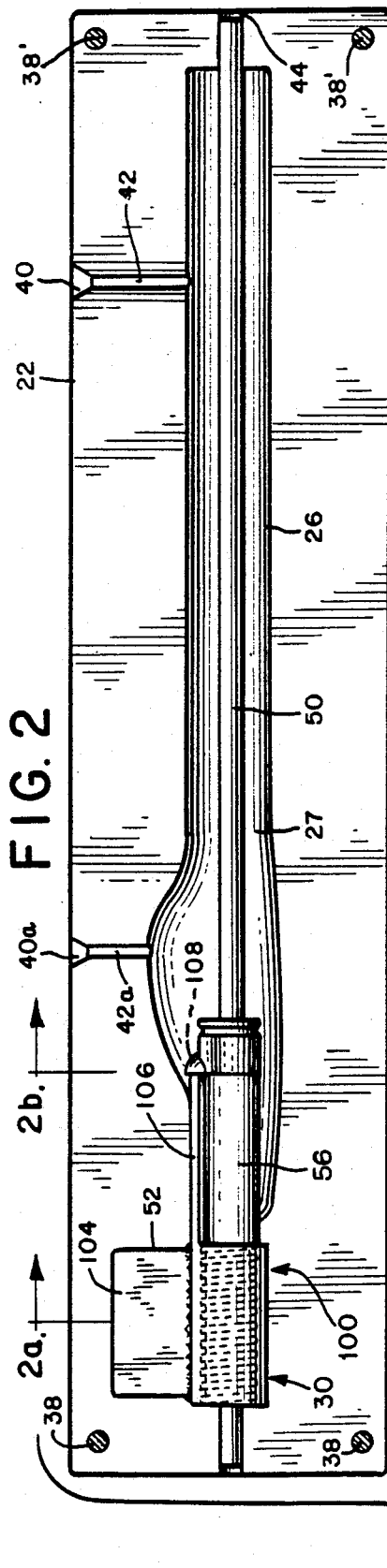
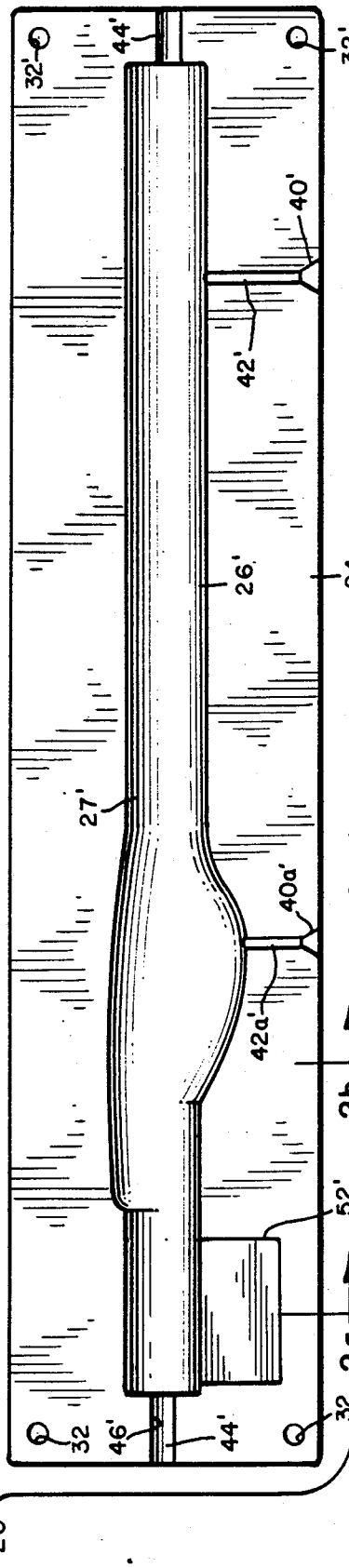
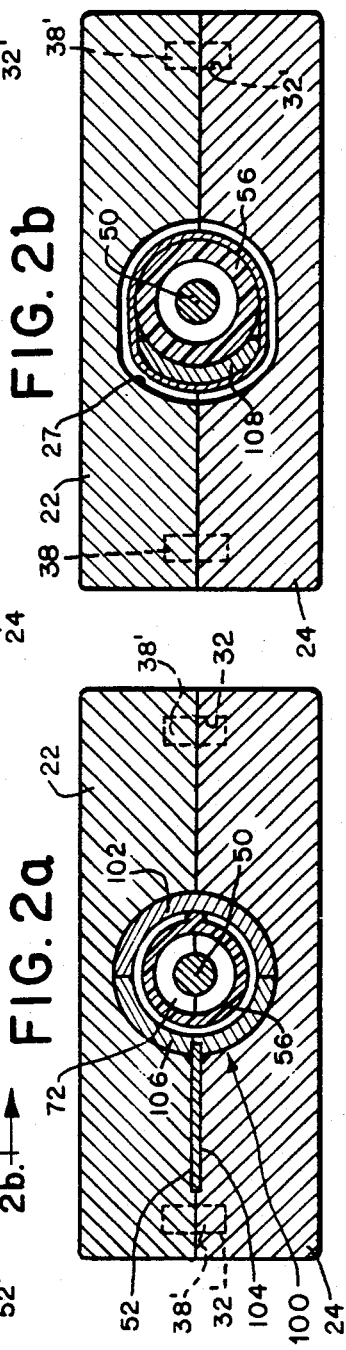

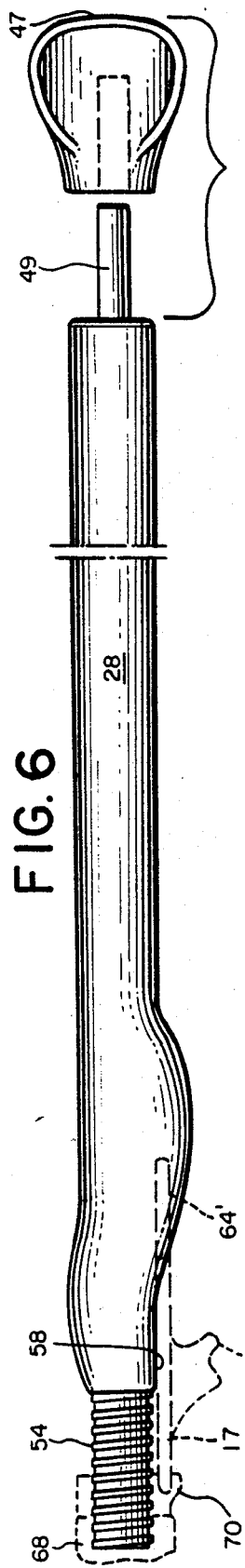
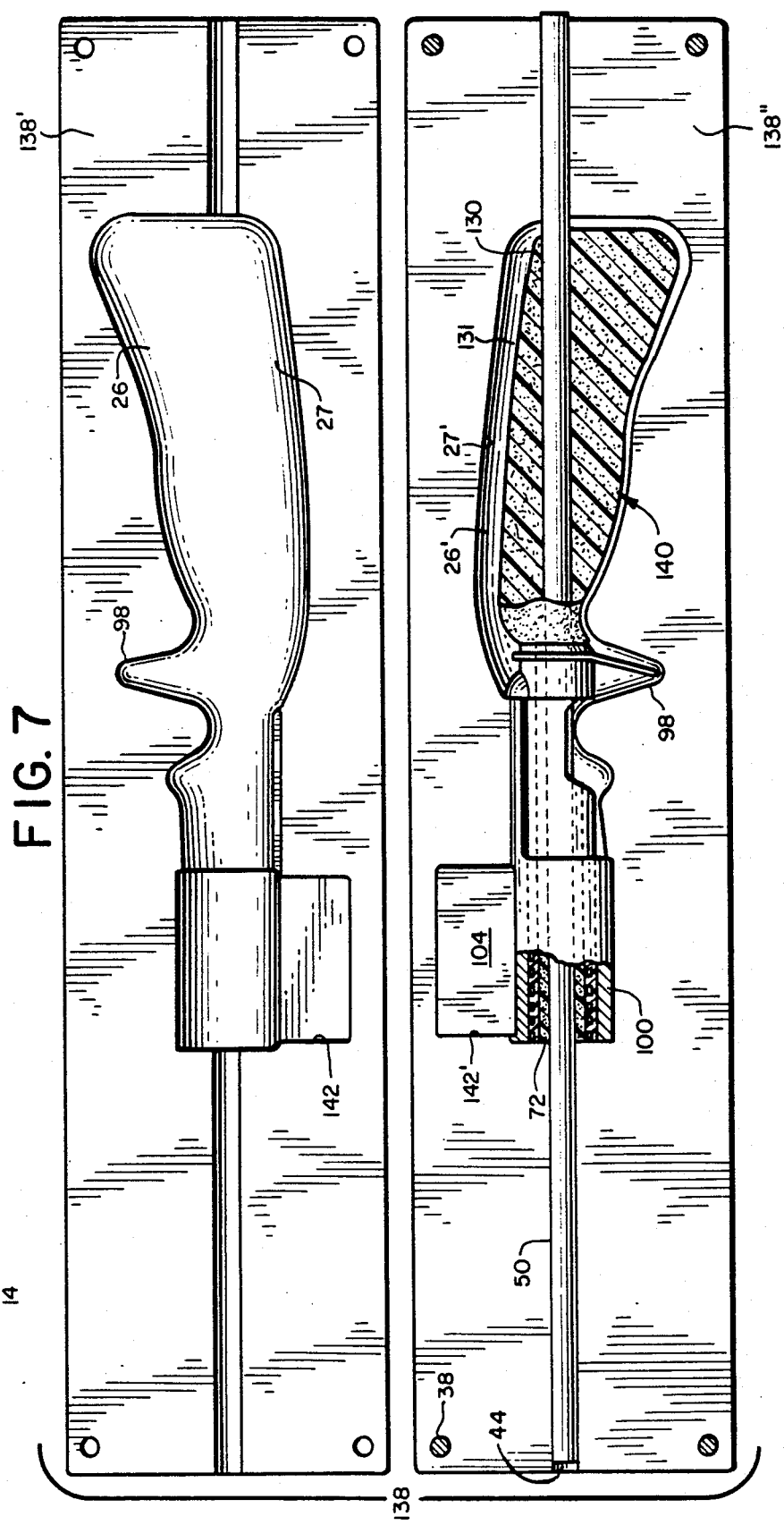

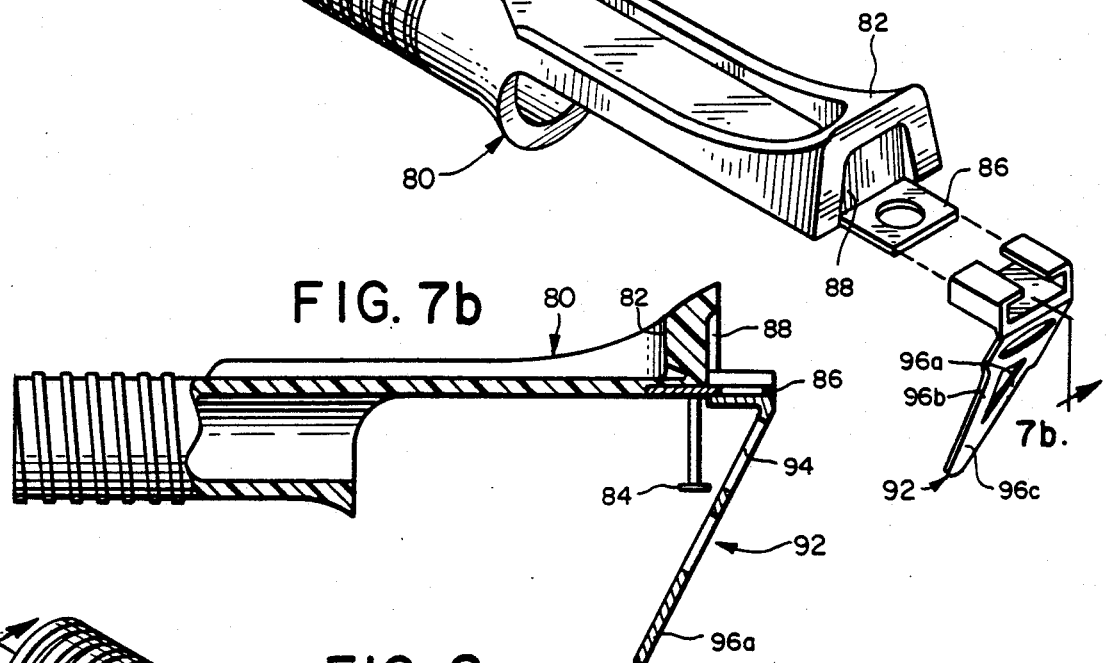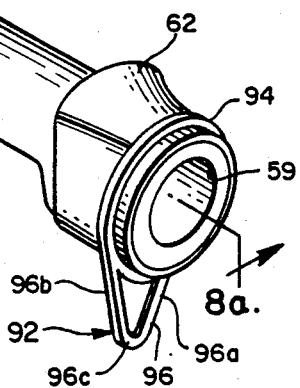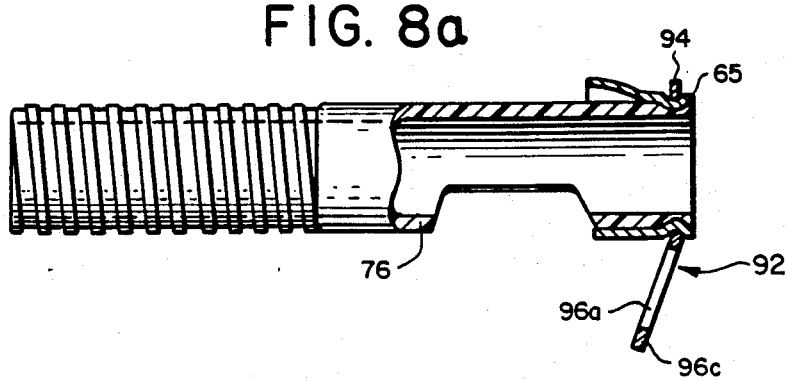

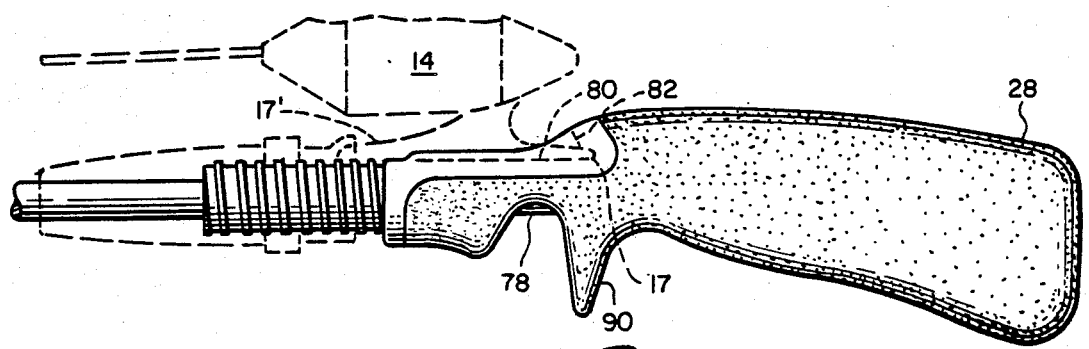
FIG. 7c
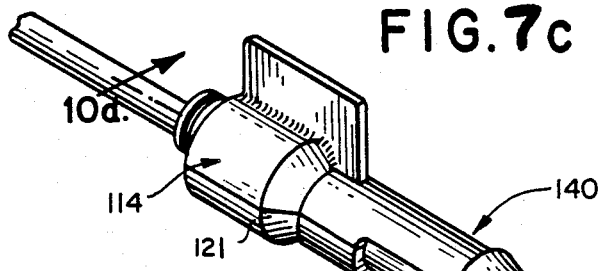
FIG. 10c
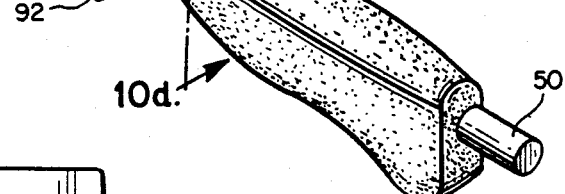
FIG. 10d
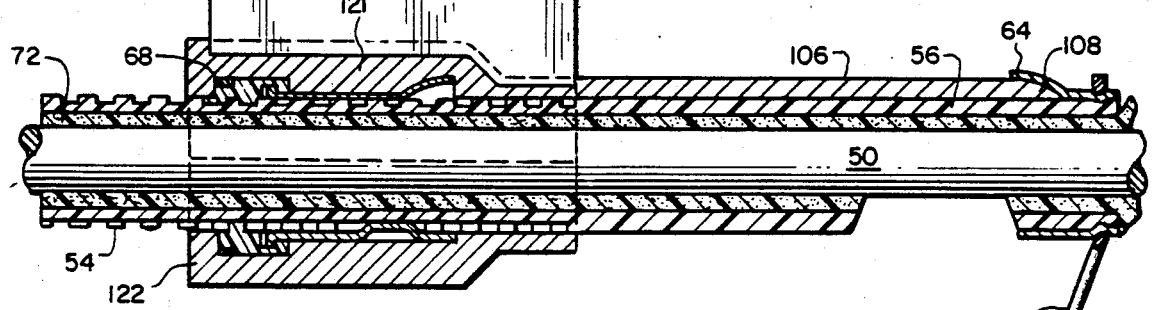
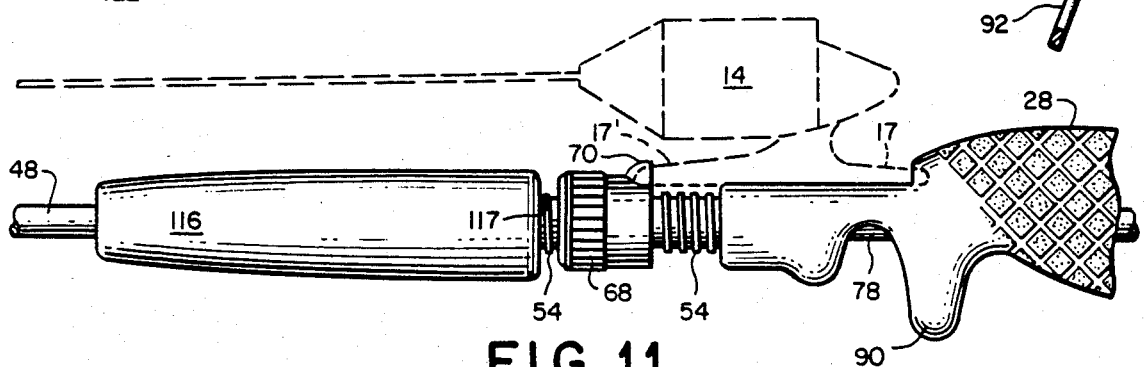
FIG. 11

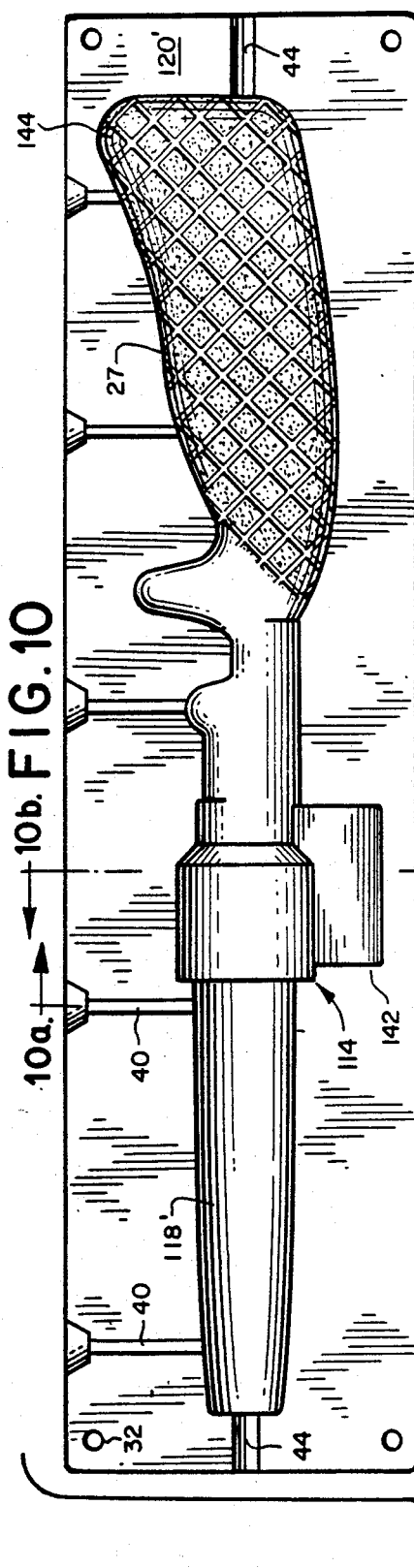
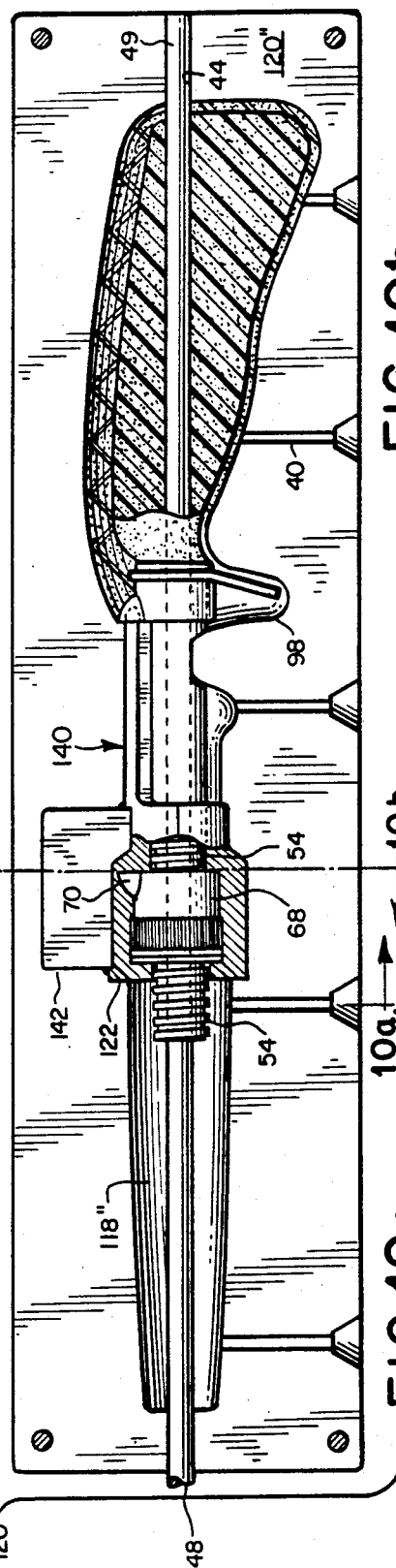
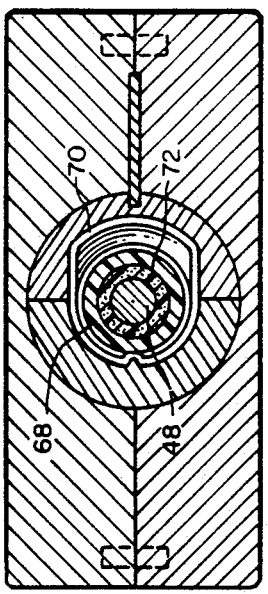
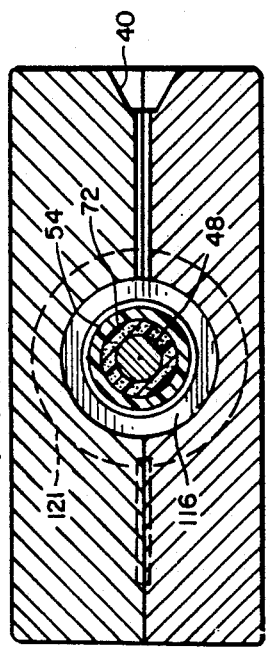
FIG.10
FIG.10a
FIG.10b

ONE-PIECE INTEGRAL FISHING ROD HANDLE

This is a division of application Ser. No. 822,752, filed Jan. 27, 1986, U.S. Pat. No. 4,726,584.

BACKGROUND AND SUMMARY OF THE INVENTION

The present invention relates to one-piece integral fishing rod handles of the through-rod construction type and a method of making the same. More particularly, this invention relates to molded integral one-piece fishing rod handles in which the aftgrip portion, the reel seat portion, and foregrip portion are joined together with the molded handle material so as to form a one-piece integral fishing handle which is lighter, more durable and easier to produce than conventional handles, and which has improved feel characteristics.

Prior art fishing rod handles of the through-rod type construction typically are assembled from a number of individual components which are affixed to a fishing rod blank. Typically, these separate components will include a rod handle aftgrip, a reel seat or handle body for securement of the fishing reel, a pair of flanges to engage the reel foot into engaging members and a foregrip portion. Arbors (i.e. cylindrical washer-like members that have a center hole through which a fishing rod blank is inserted) or tape are typically used, along with adhesive, to position and hold all of these individual components on the fishing rod blank.

The arbors must be dimensioned such that a frictional fit between the arbor, the fishing rod blank and each of the individual rod handle components is obtained. They are slid over the end of a fishing rod blank and inserted into the hollow cavities of the rod handle components and thereafter adhesively secured to both the rod blank and rod handle components. As such, the outside diameter of the arbor is dictated by the inside dimension of the handle components. Arbors also often do not provide support along the entire length of the reel seat. Rod handles assembled by this method require a large inventory of relatively precisely dimensional and machined individual handle components for manufacture. Also, this method of assembly is quite labor intensive due to all these separate components.

Rod handle bodies of the conventional type are formed by injection molding and are typically hollow. These conventional mold handles generally utilize a core pin during the molding process that produces a precise inside diameter of the hollow handle body which must be matched to the outside diameter of the rod blank for assembly if the handle body has an exposed area for finger contact with the blank. As rod blank diameters vary with the many type of action rods that are produced from a factory, large minimum production runs of the handle body are required for each rod blank size. Since one size handle cannot be used to produce completed rods of different action assembly, the rod factory inventory must be large.

Arbors are also generally used to fill the void between the outside diameter of the blank and the inside diameter of the handle body. Quite often these arbors must be drilled after assembly into the handle body to ensure an accurately sized and aligned hole for the fishing rod blank.

The drilling of conventional handles can be difficult for a number of reasons. One, the drill bit tends to move radially during a drilling operation when the drill bit passes from a solid area to an exposed or open area within the handle body such as the arbor hole, hollow reel body or the finger contact area of the hollow handle. This movement often leads to an uneven rod blank hole. Secondly, the material of the rod handle, such as graphite may not lend itself to easy drilling. The home rod builder is thus unable to custom fit a plastic handle to his favorite rod blank because he may not possess the adequate machinery for boring a consistent diameter hole in the rod handle. The above methods of producing fishing rod handles are therefore also extremely laborious and time-consuming.

The present invention is directed to a molded one-piece integral fishing rod handle and a method of molding which avoids the aforementioned shortcomings.

In accordance with an important aspect of the present invention, an improved fishing rod handle is provided which includes a preformed reel seat, means for securement of a fishing reel thereon and a molded handle which substantially surrounds the reel seat and adheres thereto to provide a one-piece integral fishing rod handle. The handle is molded from a rigid material which can be easily drilled to accept varying sizes of fishing rod blanks.

In accordance with another aspect of the present invention, a mold assembly is provided having a mold cavity in the configuration of a fishing rod handle which includes means to engage preformed individual rod handle components assembled onto a mold core pin such that the core pin and the preformed components are accurately registered within the mold cavity.

In accordance with still another aspect of the present invention, means for reinforcing portions of the molded rod handle having reduced thickness, such as finger triggers, is provided.

In accordance with another aspect of the present invention, a one-piece integral rod handle is molded on a mold core pin which has a diameter slightly less than that of the final fishing rod blank such that after molding the core pin cavity in the rod handle can then be subsequently reamed to accept any size rod blank.

In accordance with a further aspect of the present invention, a one-piece integral rod handle having a dual composition with improved fishing "feel" can be formed by first molding a rigid base handle portion onto the rod blank or core pin using a high density, rigid molding resin and then subsequently molding an outer softer surface covering for the rod handle using a low density, resilient molding resin.

Accordingly, it is a general object of the present invention to provide an improved one-piece integral fishing rod handle of the through-rod construction type.

Another object of the present invention is to provide a molding method for molding one-piece integral fishing rod handles directly onto fishing rod blanks.

Another object of the present invention is to provide a solid one-piece fishing rod handle wherein the molded portion of the rod grip substantially surrounds and adheres to a preformed reel seat portion and rod blank to form an integral and complete fishing rod.

A further object of the present invention is to provide a solid one-piece integral fishing rod handle for use in the assembly of fishing rods of the through-rod type of construction which can be easily drilled out to accept different sizes of fishing rod blanks.

Still another object of the present invention is to provide a method for molding a one-piece integral dual composition fishing rod handle in which a rod handle rigid base molded section is covered with a resilient outer surface molded section to supply greater comfort, sensitivity and durability to the fishing rod handle.

In accordance with yet another object of the present invention, means for registering individual rod handle components within a mold cavity are provided such that those components are accurately aligned within the mold cavity to provide an integrally molded rod handle.

These and other objects, features and advantages of the present invention will be clearly understood through a consideration of the following detailed description.

BRIEF DESCRIPTION OF THE DRAWINGS

In the course of this description, reference will be frequently made to the attached drawings in which identical reference numerals indicate like parts and wherein:

FIG. 2 is a plan view of a mold block and core pin assembly used in making a fishing rod handle in accordance with the present invention;

FIG. 2a is a section taken along line 2a—2a of the closed mold block of FIG. 2;

FIG. 2b is a section taken along line 2b—2b of the closed mold block of FIG. 2;

FIG. 3b is a section taken along line 3b—3a of FIG. 3a;

FIG. 6 is a completed molded handle for a spinning rod;

FIG. 7 is a plan view of a mold block and core pin assembly used in molding an alternate embodiment fishing rod handle in accordance with the present invention;

FIG. 7a is a perspective view of a modified reel seat used in molding a bait-cast rod handle in accordance with the present invention;

FIG. 7b is a cutway section view taken along line 7b—7b of FIG. 7a;

FIG. 7c is an elevational view of an alternate embodiment of a molded rod handle using the alternate reel seat illustrated in FIG. 7a;

FIG. 8 is a perspective view of an alternate reel seat assembly used in molding rod handles in accordance with the present invention;

FIG. 8a is a cutway sectional view taken along lines 8a—8a of FIG. 8

FIG. 9b is a cutway sectional view taken along line 9b—9b of the assembly shown in FIG. 9a;

FIG. 10 is a plan view of a second mold block used in molding a dual composition rod handle in accordance with the present invention;

FIG. 10a is a section of the closed mold block taken along lines 10a—10a of FIG. 10;

FIG. 10b is a section of the closed mold block taken along lines 10b-10b of the FIG. 10;

FIG. 10c is a perspective view of the rod handle core assembly shown in FIG. 10a.

FIG. 10d is a cutway sectional view taken along lines 10d-10d of FIG. 10c.

FIG. 11 is a partial elevational view of a completed rod handle molded from the mold block shown in FIG. 10 with a partial rod blank extending therefrom and a reel (shown in phantom) mounted thereon.

DETAILED DESCRIPTION OF THE INVENTION

The present invention is directed to an improved one-piece integral molded fishing rod handle for use on fishing rods of the through rod-type construction which handle may be molded either directly onto the fishing rod blank or as a separate handle which can then be drilled to accept various size fishing rod blanks.

Figure 1:
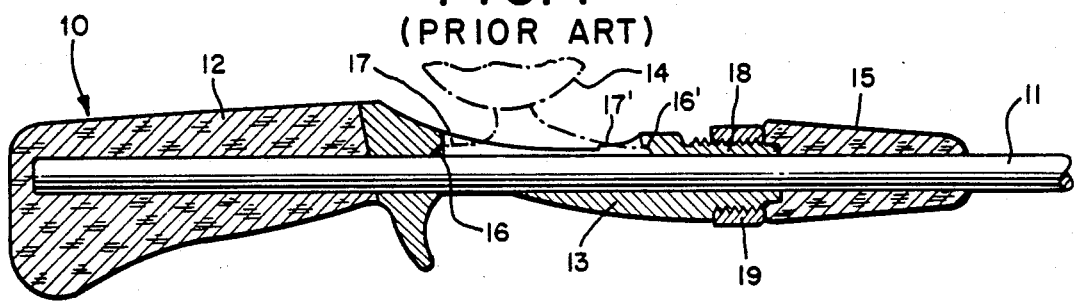
FIG. 1 is a sectional view of a fishing rod handle of conventional construction with a partial reel (shown in phantom) mounted thereon and a partial rod blank extending therefrom.

FIG. 1 illustrates a conventional fishing rod handle 10 which has been described earlier herein above, and the various separate components required for assembly thereof. It can be seen that a conventional rod handle 10 consists essentially of a fishing rod blank 11, onto which is assembled a rod handle aftgrip 12, a reel seat or handle body portion 13 to which is attached a fishing reel 14 (partially shown in phantom) and a foregrip portion 15. Two recesses 16 and 16' present in the reel seat 13 respectively receive the support feet 17 and 17' of the reel 14. The front recess typically includes a slideable reel clamp 18, guided by a threaded nut 19, which can be tightened over the front reel foot 17'. As shown by FIG. 1, conventional handles include many separate components which require a tedious assembly procedure for mounting onto the fishing rod blank 11. The present invention effectively eliminates the need for a large number of separate handle components, and will now be explained in detail.

Referring now to FIG. 2, a mold block 20 used for molding rod handles includes two mold sections 22 & 24, each having a pair of matching mold cavities 26 and 26', respectively, therein. The mold cavity defining components 26 and 26' cooperate, when the mold block 20 is closed, to define a mold cavity having general configuration which matches that desired for the finished rod handle 28 (shown in FIG. 6) except for those portions necessary for alignment and registration of the core pin assembly. As shown, the mold cavity defining components 26 and 26' are in mirror-image configuration with each other and are positioned in the respective mold sections 22 and 24 for handle-defining registration with each other.

In the illustrated embodiment, the mold block 20 is preferably formed from metal and includes suitable means for facilitating registration of the two mold sections such as pins 32 and 32' that extend outwardly from one section 24 which are respectively received by corresponding depressions 38 and 38' in the opposite section 22. When the two mold sections are assembled together, the pins 32 serve to properly align the mold cavity defining components 26 and 26'. It will be appreciated, however, that other suitable mold section registration devices may be used in association therewith or in place thereof. As shown, in the illustrated embodiment, a pair of injection ports which are formed by the respective injection port defining components 40-40' and 40a-40a' respectively communicate with channel defining components 42-42' and 42a-42a' to provide flow channels various locations of the cavity defined by components 26 and 26' enabling molding material to be positively fed into the entire mold cavity 26-26' formed when the mold block is closed. The mold may also include a liner of a suitable material to provide a non-stick surface to the cavity walls 27 and 27'.

Means for supporting the core pin assembly 30 (explained in more detail below) is included in the form of semi-cylindrical depressions 44 and 44' in each of mold sections 22 and 24. The depressions 44 and 44' extend axially inwardly into each such mold section end and, in the illustrated embodiment are located approximately along the centerline of the mold cavity 26-26', to provide a generally concentric hole in the finished handle into which a rod blank 48 (FIG. 10) can be inserted. The depressions 44 and 44' serve to properly align the core pin 50 or rod blank 48 within the molded handle. It will be apparent to those skilled in the art that depressions 44 and 44' may be located elsewhere to position the core pin 50 or rod blank 48 at locations other than the center so that handles may be molded for use o fishing rods wherein the rod blank is offset from the center. Each of depressions 44 and 44' includes a semi-circular support surface 46 and 46' which receives either a fishing rod blank 48, (as shown in FIG. 10 when the rod handle 28 is to be molded directly onto the rod blank 48), or a mold core pin 50 (as shown in FIG. 2, when the rod handle 28 is to be molded as a separate unit and later affixed to the rod blank 48).

In accordance with an important aspect of the invention, means for aligning the preformed rod components is provided in the form of additional recesses 52 and 52' in the mold sections 22 and 24 near the forward portion of the rod handle 28 (FIG. 6). These recesses 52 and 52' cooperate in the closed mold block 20 to fixedly receive a registration tab 104 of an alignment sheath 100 which will be described in greater detail below.

Figure 4:
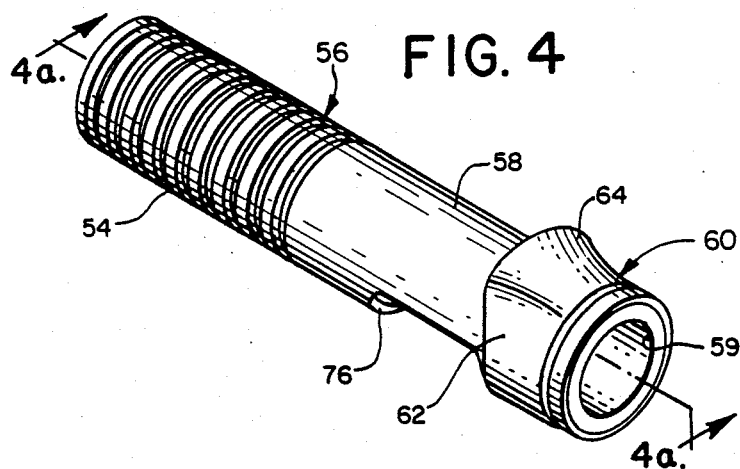
FIG. 4 is a perspective view of a reel seat used in molding a rod handle in accordance with the present invention.
Figure 4A:
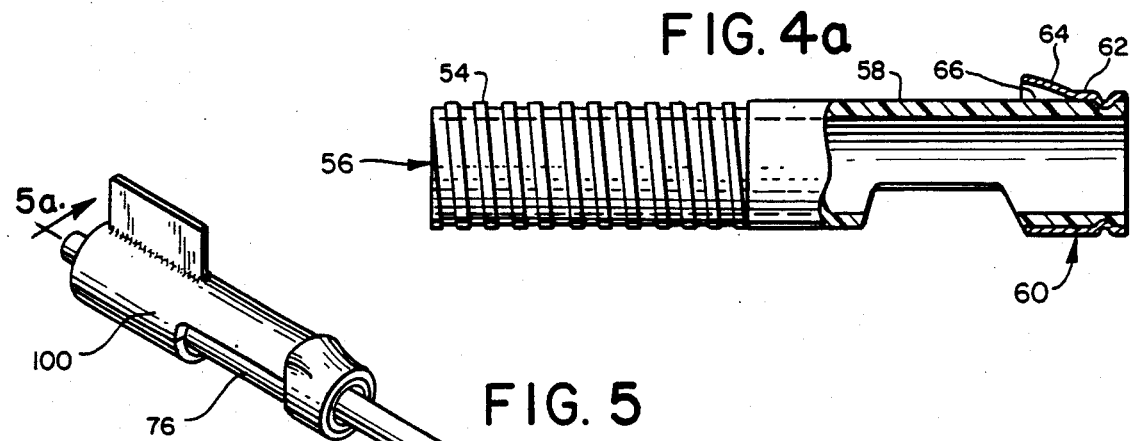
FIG. 4a is a cutaway elevation view taken along line 4a—4a of FIG. 4.

Preformed components are utilized as means for supporting the fishing reel and may typically include a fishing reel seat member 56. As shown in FIG. 4, the reel seat member 56 is generally tubular in configuration having an opening 59 therein. Member 56 has a threaded front portion 54, a reel seat portion 58 which supports the inverted T-shaped support feet 17 and 17' of a fishing reel 14 thereon, and a rear reel foot portion 60 having a hood 62 snugly attached to the reel seat member 56. The hood 62 includes a preformed rear reel foot flange 64 which defines a recess 66 between the flange 64 and reel seat 58 that engages the rear foot 17 of fishing reel 14. If desired, the preformed reel foot flange 64 ca be eliminated and a rear foot receiving slot 64' (as shown in FIG. 6) can be formed in the rod handle during the molding process. As best shown in FIG. 6, threaded portion 54 engages a slideable reel clamp 68 which includes a front reel foot flange 70 that engages the fishing reel front foot 17'. When the reel clamp 68 is tightened, it locks the fishing reel 14 firmly upon reel seat 58.

Figure 5:
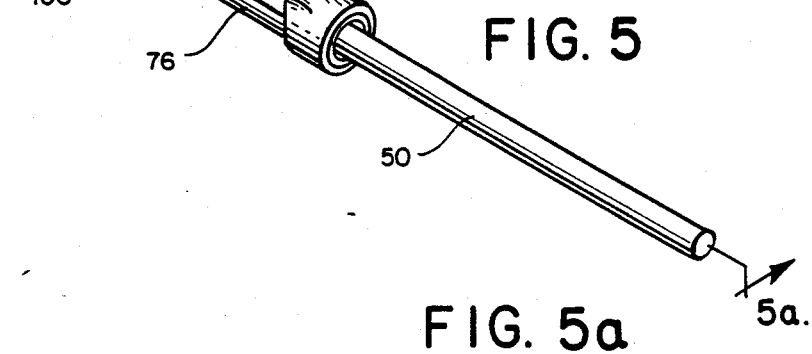
FIG. 5 is a perspective view of a core pin assembly used in molding rod handles in accordance with the present invention.
Figure 5A:
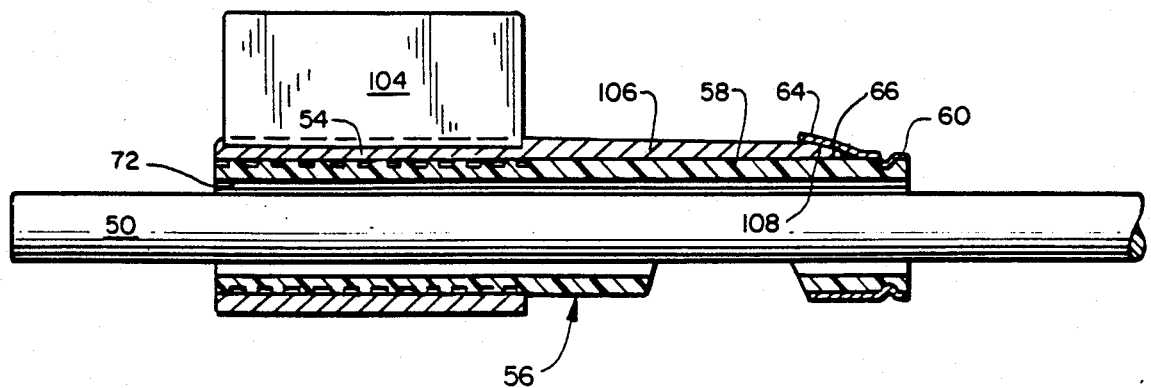
FIG. 5a is a sectional view taken along lines 5a—5a of FIG. 5.

Opening 59 of reel seat member 56 is preferably dimensioned to receive rod blank 48 or core pin 50 with an annular space 72 between the core pin or blank and the reel seat member 56 to allow entry of molding material therebetween along substantially the entire length of member 56 (See FIGS. 2a-b & 5a). Reel seat member 56 is preferably constructed from a material which possesses the strength and rigidity desired for its application. In this regard, graphite or filled ABS plastic has been found to be particularly suitable. Other materials exhibiting properties and characteristics can be substituted in place thereof and will be apparent to those skilled in this art.

Due to the solid nature of the finished rod handle 28, the bottom portion 76 of reel seat member 58 can be removed, for example by grinding, (as shown in FIGS. 8-8a) prior to placing it on the core pin assembly 30 without sacrificing any strength in the finished handle to expose a portion 78 of the rod blank 48 in the finished assembly. This exposed rod blank portion 78 is preferably positioned forwardly of the finger trigger 90. Due to the hollow nature of fishing rod blanks, vibrations of the bait which are transmitted through the blank are detected by the user, thereby allowing him to "feel" when the fish takes the bait. The mold cavity 26 may also be configured such that the rod blank portion 78 is exposed in the molding process and handle portion 76 may be ground away after the handle is molded and core pin removed.

FIGS. 7a & 7b depict an alternate reel seat member 80 which has specific application in molding rod handles for baitcasting fishing rods. Means for improving the bond between reel seat member 80 and the molded portion of the rod handle is shown as one or more studs 84, which extend from underneath the seat member on opposite sides of the core pin 50 into the open area of the mold cavity 26 beneath the rear reel foot flange 82. During molding, the studs 84 become embedded in the handle 28. The studs 84 may be formed integrally with reel seat member 80 or may be separate such as the metallic rivets shown and can either be screwed or adhesively secured to the reel seat member. Other means for improving the bond between the rod handle 28 and reel seat members may include a tab 86, shown extending rearwardly from the rear reel foot flange 82, or depressions 88 in the reel seat member 80 which increase the surface area of the reel seat in contact with the molding material.

A bait cast fishing rod handle as illustrated in FIGS. 7c & 11 typically includes a finger trigger 90 positioned underneath the reel seat 58. Since trigger portion 90 has a reduced thickness relative to the remainder of the rod handle 28, it is advantageous to provide a reinforcement insert 92 in this portion of the handle to reinforce the molded finger trigger 90. As shown in FIGS. 8 and 8a, insert 92 may include a circular rim 94 integrally formed with a downwardly and forwardly extending integral U-shaped element 96 having a pair of legs or struts 96a and 96b which converge into a bight portion 96c.

In accordance with one embodiment of the present invention, insert 92 is slipped over the rod blank 48 or core pin 50 and fixedly positioned on a tab 86 of reel seat member 80 (FIGS. 7a & 7b). Tab 86 holds the insert 92 within the trigger portion 98 of the mold cavity 26-26' so that it is spaced a predetermined distance away from the walls 27-27' of closed mold cavity 26-26' preferably approximately along the center line of the trigger 90.

Preferably, insert 92 is constructed of metal to provide sufficient strength to provide sufficient reinforcement for trigger 90.

Alternatively, the insert 92, when used on the seat member 56 shown in FIG. 8, may be joined thereto by way of interfitting with groove 65 (FIG. 8a) which engages insert rim 94. It will also be understood that insert 92 and the reel seat member 56 may also be preformed as one integral piece.

Figure 3:
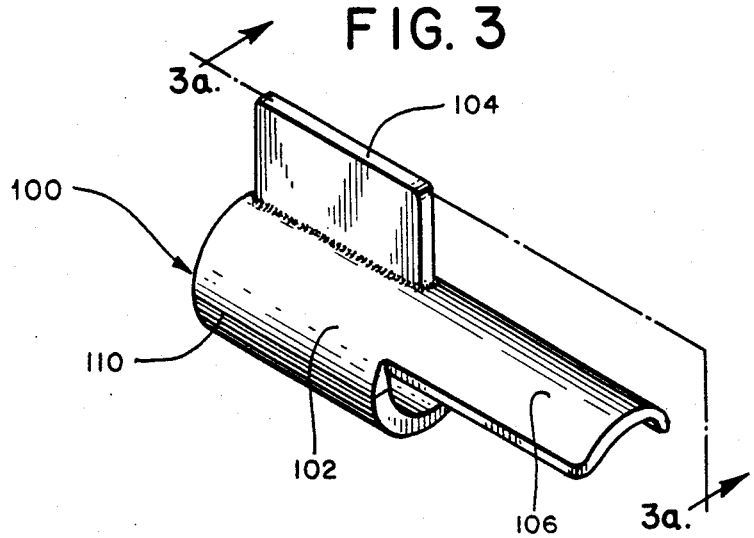
FIG. 3 is a perspective view of the alignment sheath used in molding rod handles in accordance with the present invention.

Since fishing reels, when assembled onto a rod handle, must be properly aligned with the rod line guides and the horizontal displacement of the reels limited with respect to the rod, an important aspect of the invention includes means for accurately aligning the reel seat member 56 on the core pin 50 in the mold cavity 26 which is provided in the form of an alignment sheath 100 (FIG. 3). Hollow sheath 100 has a generally tubular configuration and includes a collar portion 102, a registration tab 104 and an axial arcuate portion 106 having a curvature which is concentric with the rod blank 11 or core pins 50. Sheath 100 is assembled onto the core pin 50 (FIGS. 5 & 5a) so that the collar 102 fits substantially over all of the threads of front portion 54 of the reel seat member 56 to protect them from being fouled with molding material during molding. The axial arcuate portion 106 extends rearwardly from the collar 102 along a longitudinal axis generally parallel to the axis of reel seat 58.

Figure 3A:
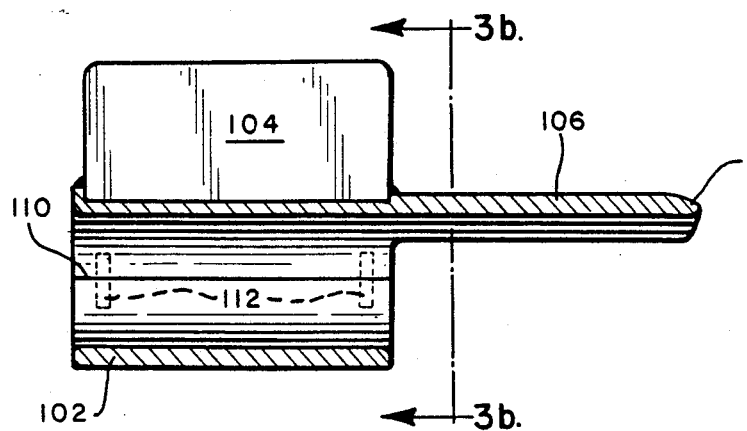
FIG. 3a is a section taken along line 3a—3b of FIG. 3.
Figure 3B:
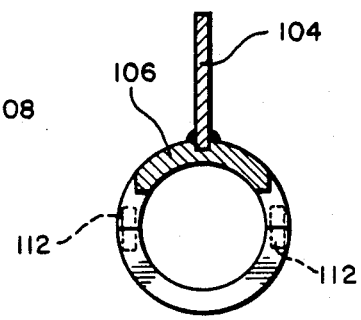

As shown, axial arcuate portion 106 has a cross-sectional configuration that is complementary to the reel seat 58, shown as semi-circular in FIG. 3b, and snugly fits onto and over the reel seat portion 58 of seat member 56. The rearward end 108 of arcuate portion 106 corresponds to the radius of curvature of reel feet 17 and 17' and engages the recess 66 between the rear foot flange 64 and reel seat 58 so that the collar portion 102 is accurately positioned over the front threads 54. Arcuate portion 106 of sheath 100 is thereby accurately positioned over the reel seat portion 58 and substantially prevents an contact of the molding material therewith.

Registration tab 104 extends radially outwardly from the collar 102 of sheath 100 and is located thereon so that it is received in a complimentary shaped recess 52 in the closed mold 20. When the tab 104 engages the alignment recesses 52-52', all the preformed components of core pin assembly 30 are properly aligned within the mold cavity 26-26'. Tab 104 supports and aligns the reel seat member 56 and the finger trigger insert 92 accurately within the mold cavity 26-26', while the mold core pin depressions 44-44' support the core pin 50 or rod blank 48 within the reel seat member 56 (FIGS. 2a & 2b) to provide the annular space 72 between the two. For ease in removing the sheath 100 from the handle after molding, sheath 100 may be split into two sections along a longitudinal axis 110 and may then include pins 112 (FIGS. 3a and 3b) to assemble the sheath together.

Referring now in detail to FIGS. 10 and 10a-d, a modified sheath 114 is shown which is used in molding an alternate embodiment of a rod handle. In this embodiment, the molded rod handle of which is shown in FIG. 11, both the handle 28 and the foregrip 116 are molded as an integral handle structure which includes a slideable reel clamp 68 thereon. As seen in FIG. 10, the mold block 120 formed by mold sections 120' and 120" is also modified to include additional cavities 118' and 118" in a shape corresponding to the foregrip 116 (FIG. 11) into which part of the threaded front portion 54 of reel seat member 56 projects.

In this embodiment, the sheath 114 is similar to that described earlier except that the collar portion 121 is enlarged in the radial dimension (FIG. 10d) so that it will accommodate a slideable reel clamp 68 therein. The clamp 68 is threaded onto the front portion 54 of the seat member 56 prior to insertion into the sheath 114. The front of sheath 114 includes a shield portion 122 (FIG. 10d) which preferably extends radially inwardly into contact with the front threads 54 of the reel seat member 56. Shield 122 serves to prevent the entry of molding material onto the threads and reel clamp 68, and also defines the rear face 117 of foregrip 116. The axial length of the collar 121 is chosen so that it will provide an adequate length to cover all or substantially all of the threads 54 for the travel of reel clamp 68 to contact fishing reel 14 on the finished handle 28. During manufacture, the molding material is able to flow from the handle portion to the foregrip portion via the annular space 72 between core pin 50 and seat member 56 to connect the two, so that a one-piece integral rod handle-foregrip structure is formed.

Of the many types of molding materials that may be used in this invention, moldable plastic resins are preferred because of their many desirable properties such as high strength, durability, low sensitivity to ultraviolet radiation, ease of drilling and water-repellency characteristics. A preferred characteristic of polyurethane resins is the foaming process that occurs when a polyurethane resin and reactant is poured or injected into the mold, under which the polyurethane expands at a pressure sufficient to fill all the open cavities of the mold. Polyurethane resins selectively can be made flexible, semi-rigid and rigid by varying the starting materials. Rod handles of the present invention molded from polyurethane are sufficiently sturdy to resist surface wear and damage or deformation when dropped, and yet are comfortable and not too rigid to provide a "stony" feel to the fisherman. It will be appreciated, however, that other thermosetting resins are also contemplated in the present invention.

For molding rod handles as described above, a core pin 50 or rod blank 48 of a predetermined dimension is initially selected. Where a core pin 50 is used, a mold release agent may be applied thereto. The alignment sheath 100 is assembled onto a preselected reel seat member 56 so that the sheath finger portion 106 engages the rear reel foot recess 66. These members are then placed over the preselected core pin or rod blank to form a core pin assembly 30. The core pin assembly 30 is set into the mold block 20 so that the alignment depressions 44-44' engage the core pin 50 and the registration recess 52 engages the registration tab 104 of sheath 100. A molding resin and reactant are then poured into the mold cavity 26 and the mold closed or, alternatively the resin and reactant can be simultaneously injected into the closed mold through ports 40-40' and 40a-40a'.

When the reaction has been completed and the molding resin has cured, the completed handle 28 is removed from the mold and the core pin 50 and sheath 100 are removed from the handle exposing the rod blank hole therein. The rod handle is then trimmed or sanded to remove any molding flash present and can be finished in the manners described later below. A rod blank 48 may then be inserted into the blank hole and adhesively attached thereto. Rod handles can be molded using a core pin having a diameter equivalent to that of smallest rod blank available from the factory. The tubular channel left by the core pin 50 can be easily drilled or reamed to accomodate different size rod blank diameters thereby accepting the full range of factory-sized rods.

Figure 9:
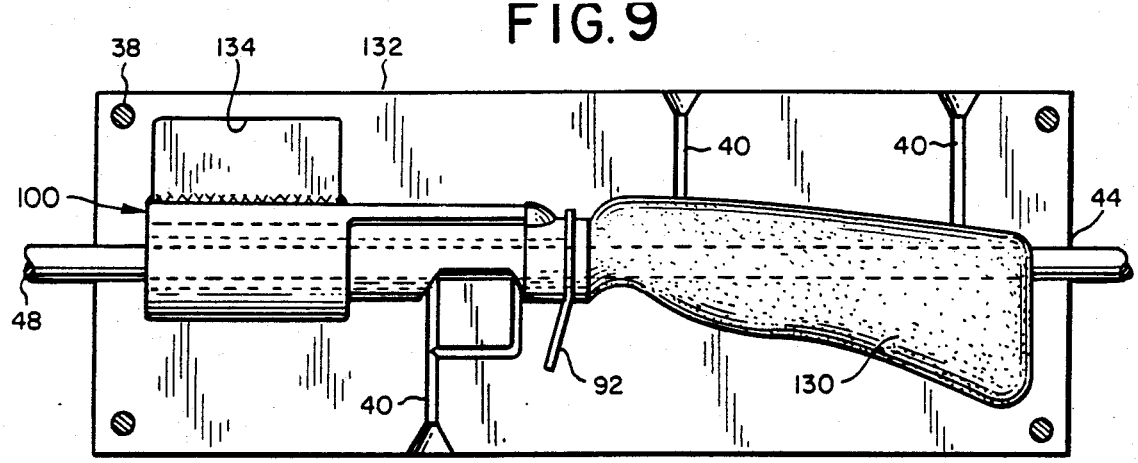
FIG. 9 is a plan view of a mold block used in molding another alternate embodiment of the present invention.
Figure 9A:
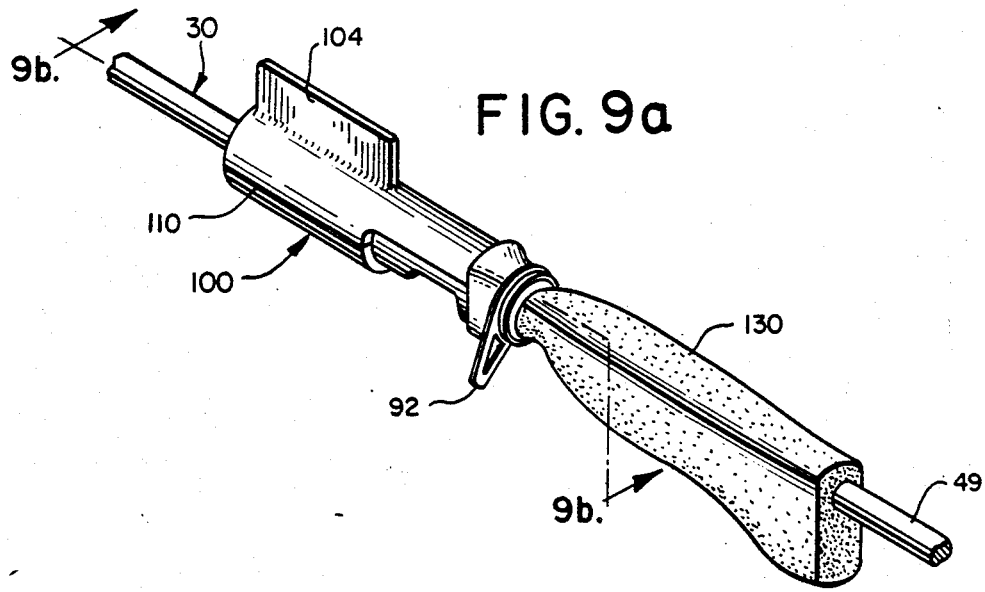
FIG. 9a is a perspective view of a molded rod handle core and core pin assembly produced by the mold block shown in FIG. 9.
Figure 9B:
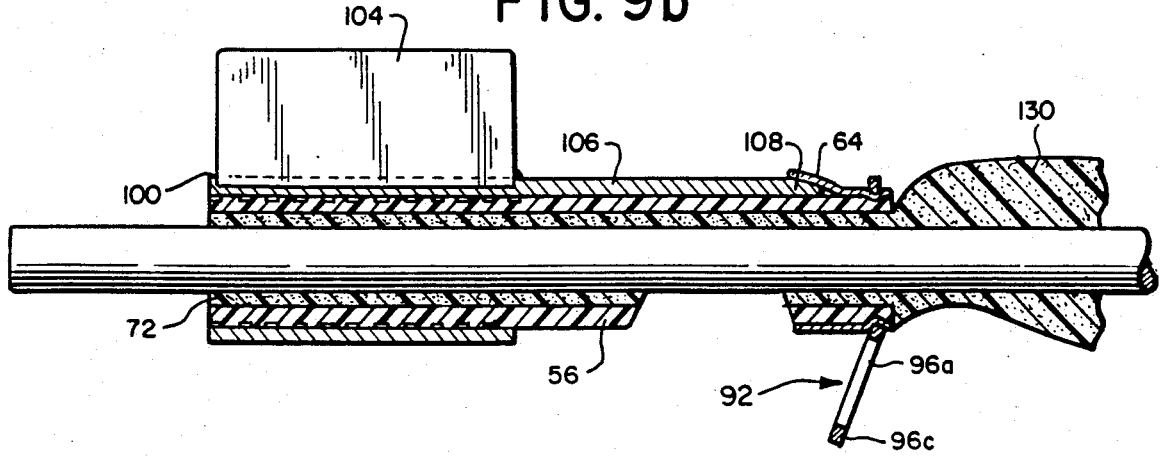

If desired, a fishing rod blank 48 may be substituted in place of the core pin 50 in the molding process so that the rod handle is molded in place upon the rod blank 48. The rod blank is securely bonded to the handle during molding due to the adhesive nature of the molding resin. In such an application, the rod blank 48 may extend completely through the mold cavity 26 and be received by the depression 44 located at the rear of the mold (FIG. 9). The protruding rod blank end 49 is trimmed off after molding to match the handle configuration. As shown in FIG. 6, the end 49 may be also left intact and a preformed butt cap 47 may be glued thereto.

Another embodiment of the present invention is illustrated in FIGS. 7 & 9, wherein a one-piece integral fishing rod handle has a dual composition handle body and includes a surface portion that is comprised of low-density, resilient polyurethane resin which is supported on and reinforced by a rigid rod handle core 130 molded from a high density rigid polyurethane.

The handle core 130 is molded as a "first shot" in a first mold 132, shown in FIG. 9, which is similar in all respects to the mold described hereinabove, except that the first mold cavity is dimensioned smaller than the finished product size and has a configuration in the shape of handle core 130. Similar to the manner described above and using the preformed rod handle components also described above, the preformed components are assembled onto either a core pin 50 or rod blank 48.

A release agent may be applied to both the core pin assembly and surface of the first mold cavity to allow for easy removal of the molded core 130 from first mold 132. The core pin assembly 30 is placed into the first mold 132 such that the registration tab 104 is engaged with an alignment recess 134 and the assembly 30 is placed into the core pin depressions 44-44'. Preferably, first mold 132 is configured in a manner such that the core pin assembly 30 and finger trigger insert 92 will not have a mold cavity around them to receive the first shot of molding resin. The mold is closed and a high density rigid molding resin and reactant are poured or injected into the mold and cured. When removed, the handle core will be lacking an outer surface layer or skin which is approximately equal to the difference between the exterior 131 (FIG. 7) of the handle core 130 and the walls 27-27' of the second mold cavity (FIG. 7).

The handle core 130 is removed from the first mold 132 with the alignment sheath 100 still in place, and then is inserted into a second mold 138, to which also a mold release has been applied. In instances where an integral handle-foregrip is desired, the sheath 100 may be removed and a reel clamp 68 threaded onto the reel seat member 56 and the modified sheath 114 assembled onto the core pin 50 to form a handle core assembly 140.

The handle core assembly 140 is placed in the second mold cavity (FIG. 7) so that alignment tab 104 engages an alignment recesses 142-142' to accurately align the handle core assembly 140 within the second mold 138 comprised of mold sections 138' and 138''. The second mold is closed and a low density molding resin and reactant are poured or injected into it, shown in FIG. 10, for a second molding "shot." Where polyurethane resins are used for this process, it has been found that during the second molding step, the outer resilient polyurethane layer will penetrate the rigid polyurethane core to some extent and form a bond therewith such that the two polyurethane layers are integrally joined and a solid one-piece dual composition fishing rod handle is formed.

When the finished rod handle is released from the second mold 138, any molding flash can be trimmed and the rod handle may then be appropriately finished as by sanding, painting, etc.

The final surface finishing of all of the rod handles described above can be achieved in a variety of ways. For example, a coloring agent may be added to the molding resin. Also, the mold cavities can be dusted with a particulate matter such as powdered cork, prior to inserting the core pin assembly to induce texture in the finished rod handle. The cork powder will adhere to the release agent applied to the mold cavity and will embed itself in the molded portion of the handle and give a uniform appearance thereto. Other finishing alternatives may include dipping the rod handle in a liquid latex or other similar solution to provide a non-slip covering on the handle.

Textured rod handle surfaces may be provided by including a series of raised ridges 144 on the mold cavity walls 27 to provide a series of complimentary-shaped depressions on the surface of the rod handle aftgrip, after molding. Other modifications to the mold cavity surface such as scoring, stippling or the like may also be used to form other desired rod handle surface textural characteristics.

While the preferred embodiments of the invention have been shown and described, it will be obvious to those skilled in the art that changes and modifications may be made therein without departing from the spirit of the invention the scope of which is defined by the appended claims.

We claim:

1. A lightweight one-piece solid fishing rod handle comprising a solid handle portion integrally molded to a reel seat portion, the reel seat portion including an elongate reel seat having means for mounting a fishing reel thereon, the elongate reel seat being integrally formed in a body having a hole axially extending therethrough and into said handle portion which is adapted to receive a fishing rod blank therein, said handle portion further including a trigger portion extending downwardly beneath said reel seat portion and including means for reinforcing the trigger portion positioned within said handle portion, said trigger reinforcing means including an insert having a generally circular rim defining an opening therein which is adapted to receive a fishing rod blank therethrough, said insert opening being axially aligned with said rod blank hole, said insert extending downwardly from said rim into said trigger portion and being spaced a predetermined distance within said trigger portion.

2. The fishing rod handle of claim 1, wherein said handle and reel seat portion includes means for lockingly receiving forwardly and rearwardly extending reel feet on a fishing reel to be mounted thereon.

3. The fishing rod handle of claim 2, wherein said locking means includes a reel clamp slideably mounted on said reel seat portion, said reel clamp being adapted to securely engage one of said reel feet of a fishing reel mounted thereon.

4. The fishing rod handle of claim 1, wherein said solid handle body is molded polyurethane.

5. The fishing rod handle of claim 1, further including a solid foregrip portion integrally molded to said reel seat portion, said solid foregrip portion further including an opening axially extending therethrough in axial alignment with said fishing rod blank hole.

6. The fishing rod handle of claim 5, wherein said solid foregrip portion is integrally molded to said reel seat portion and said solid handle portion by a layer of handle material which axially extends between said solid handle portion and said solid foregrip portion in an annular passage between the outer periphery of said rod blank hole and said reel seat body, whereby said solid foregrip portion is integrally joined to said reel seat portion and said handle portion.

7. The fishing rod handle of claim 1, wherein said solid handle portion is molded around said reel seat body.

8. A lightweight one-piece solid fishing rod handle comprising a handle body portion having a solid rigid handle core integrally molded to a preformed reel seat portion, the reel seat portion including an elongate reel seat having means for mounting a fishing reel thereon, the handle body further including a resilient handle covering integrally molded to and overlying said solid rigid handle core, the reel seat portion being integrally formed in a body having a hole axially extending therethrough which is adapted to receive a fishing rod blank therein, said handle body portion further including a trigger portion extending downwardly beneath said reel seat portion and including means for reinforcing the trigger portion, said reinforcing means including an insert having a generally circular rim defining an opening therein which is adapted to receive the passage of a fishing rod blank therethrough, said insert opening being axially aligned with said rod blank hole, said insert extending downwardly into said trigger portion and being spaced a predetermined distance within said trigger portion.

9. The fishing rod handle of claim 8, wherein said handle portion and reel seat portion includes means for lockingly receiving forwardly and rearwardly extending reel feet on a fishing reel to be mounted thereon.

10. The fishing rod handle of claim 9, wherein said locking means includes a reel clamp slideably mounted upon said reel seat portion, said reel clamp being adapted to securely engage one of said reel feet of a fishing reel mounted thereon.

11. The fishing rod handle of claim 8, wherein said handle core is a molded rigid polyurethane and said handle covering is a molded resilient polyurethane.

12. The fishing rod handle of claim 8, further including a solid foregrip portion integrally molded to said preformed reel seat portion, the solid foregrip portion having an opening axially extending therethrough in axial alignment with said rod blank hole.

13. The fishing rod handle of claim 12, wherein said solid foregrip portion is integrally molded to said preformed reel seat portion and said solid rigid handle core by a layer of handle material which extends axially between said solid rigid handle core and said solid foregrip portion in an annular passage between the outer periphery of said rod blank hole and said preformed reel seat portion, whereby said solid foregrip portion is integrally joined to said preformed reel seat portion and said rigid handle core.

14. The fishing rod handle of claim 8, wherein said handle body substantially surrounds said preformed reel seat.

* * * * *